(12) United States Patent
Forssberg

(10) Patent No.: US 8,475,319 B2
(45) Date of Patent: Jul. 2, 2013

(54) FINAL DRIVE COMPRISING A LUBRICATION SYSTEM

(75) Inventor: Steven P. Forssberg, Waterloo, IA (US)

(73) Assignee: Deere & Company, Moline, IL (US)

( * ) Notice: Subject to any disclaimer, the term of this patent is extended or adjusted under 35 U.S.C. 154(b) by 411 days.

(21) Appl. No.: 12/779,165

(22) Filed: May 13, 2010

(65) Prior Publication Data

US 2011/0281680 A1 Nov. 17, 2011

(51) Int. Cl.
- F16H 57/04 (2010.01)
- F16H 57/10 (2006.01)
- F16H 48/06 (2006.01)
- F16H 48/22 (2006.01)

(52) U.S. Cl.
USPC .......................... 475/230; 74/606 R

(58) Field of Classification Search
USPC ............................ 475/159, 160, 231
See application file for complete search history.

(56) References Cited

U.S. PATENT DOCUMENTS

| | | | | |
|---|---|---|---|---|
| 4,140,198 A | * | 2/1979 | Chamberlain | 188/71.6 |
| 4,736,821 A | * | 4/1988 | Ries | 74/606 A |
| 5,197,574 A | * | 3/1993 | Al-Deen et al. | 188/71.6 |
| 5,911,292 A | * | 6/1999 | Schade et al. | 192/70.12 |
| 5,989,143 A | * | 11/1999 | Bell et al. | 475/160 |
| 6,662,920 B2 | * | 12/2003 | Hofer et al. | 192/35 |
| 6,866,605 B2 | * | 3/2005 | Fabry | 475/160 |
| 7,201,692 B2 | * | 4/2007 | Morgensai | 475/160 |
| 7,625,308 B2 | * | 12/2009 | Okazaki | 475/160 |
| 7,918,315 B2 | * | 4/2011 | Vu | 184/6.12 |
| 8,167,758 B2 | * | 5/2012 | Downs et al. | 475/160 |
| 8,267,827 B2 | * | 9/2012 | Durbin et al. | 475/159 |

* cited by examiner

Primary Examiner — Justin Holmes
Assistant Examiner — Jacob S Scott

(57) ABSTRACT

A final drive comprising a lubrication system is provided. The final drive comprises a differential housing and a reaction plate, wherein the reaction plate is mounted to the differential plate. The final drive also comprises a shaft and a friction disc. The shaft is rotatably disposed with differential housing, and the friction disc, which has a lubrication hole, is mounted about the shaft. The lubrication system comprises a differential supply passage positioned in the differential housing, and it also comprises a plate passage positioned in the reaction plate. The plate passage is in fluid communication with the differential supply passage, and the plate passage is in intermittent fluid communication with the lubrication hole.

15 Claims, 6 Drawing Sheets

FINAL DRIVE COMPRISING A LUBRICATION SYSTEM

FIELD OF THE DISCLOSURE

The present disclosure relates to a work machine comprising a final drive. More specifically, the present disclosure relates to a final drive comprising a lubrication system.

BACKGROUND OF THE DISCLOSURE

A work machine utilizes a drivetrain to transmit power from an engine to a set of wheels. In the drivetrain, a clutch transmits engine power to a transmission, and the transmission transmits power to a final drive. The final drive comprises a differential gearset, planetary gearset a differential housing, and an axle housing. An input shaft transmits power from the differential gearset to the planetary gearset, and an output shaft transmits power from the planetary gearset to the set of wheels. A lubricant is contained within the axle and differential housings, and thus, the planetary gearset and the differential gearset operate in conjunction with the lubricant.

In the planetary gearset, there is a sun gear, a ring gear, a carrier, pins, and planet gears. The sun gear, which is the center of the planetary gearset, may be formed into the input shaft, or it may be splined onto the input shaft. The planet gears and the carrier rotate about the sun gear. The planet gears are meshed between the ring gear and the sun gear, and the planet gears turn on their own pins around the sun gear. The pins are engaged with the carrier to ensure that the planet gears are equally spaced. The carrier may be connected to the output shaft.

The final drive further comprises a brake assembly. In the brake assembly, there is a friction disc splined to the input shaft. To prevent rotation of the friction disc and input shaft, a piston, a piston plate, and a reaction plate sandwich the friction disc. The friction disc has grooves on each of its sides to facilitate the flow of the lubricant.

When the planetary gearset and friction disc rotate at a high speed, they cause the lubricant to rotate. As the lubricant rotates, centrifugal forces cause it to travel in a radial direction away from the rotational axis of the input shaft. Accordingly, the lubricant travels in a rotational direction and in a radial direction, and this causes the lubricant to travel about the inner surfaces of the differential and axle housings in the form of a lubricant ring. Under these circumstances, the lubricant may not cover the entire friction disc. Accordingly, there is a need for a final drive comprising a lubrication system to provide sufficient lubricant to the brake assembly. Such a system increases the brake's energy density capability and improves the brake assembly's durability characteristics.

SUMMARY OF THE DISCLOSURE

In the present disclosure, a final drive comprising a lubrication system is provided. The final drive comprises a differential housing and a reaction plate, wherein the reaction plate is mounted to the differential plate. The final drive also comprises a shaft and a friction disc. The shaft is rotatably disposed with differential housing, and the friction disc, which has a lubrication hole, is mounted about the shaft. The lubrication system comprises a differential supply passage positioned in the differential housing, and it also comprises a plate passage positioned in the reaction plate. The plate passage is in fluid communication with the differential supply passage, and the plate passage is in intermittent fluid communication with the lubrication hole. The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
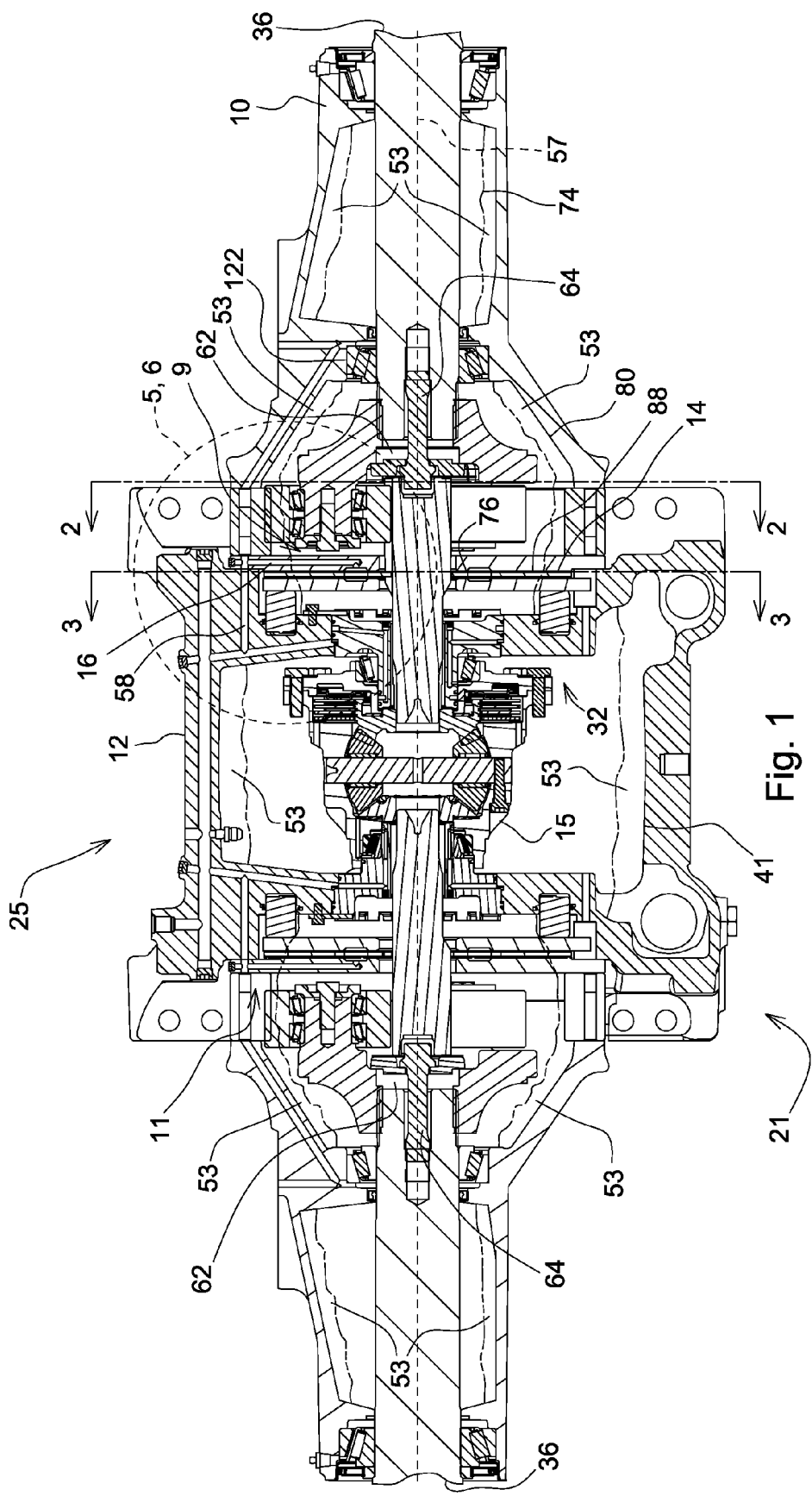
FIG. 1 is a sectional view of a final drive comprising a lubrication system, wherein a planetary gearset and a friction disc are rotating at a high speed.

FIG. 1 is a sectional view of a final drive 25 comprising a lubrication system 9, wherein a planetary gearset 17 and a friction disc 14 are rotating at a high speed. The final drive 25 also comprises a second lubrication system 11. The lubrication systems 9, 11 may be identical mirror images of one another. Accordingly, they are both within the scope of the claims, but to avoid redundancy, the second lubrication system 11 is not described separately.

The final drive 25 and the lubrication systems 9, 11 may be used in a work machine (not shown), such as an agricultural tractor or a construction machine. A drivetrain 21 transmits engine power to a set of wheels (not shown). To do this, a clutch (not shown) transmits the engine power to a transmission (not shown), and the transmission transmits the engine power to the final drive 25. The final drive 25 comprises the following components: a differential gearset 15, the planetary gearset 17, an axle housing 10, a differential housing 12, a reaction plate 30, and a brake assembly 32. The brake assembly 32 comprises the friction disc 14, a piston 60, and a piston plate 68. The piston plate 68 and the reaction plate 30 are concentric to an input shaft 34. The friction disc 14 is between the piston plate 68 and the reaction plate 30.

The input shaft 34 is used to transmit power from the differential gearset 15 to the planetary gearset 17, and an output shaft 36 is used to transmit power from the planetary gearset 17 to the set of wheels (not shown). The planetary gearset 17 and the differential gearset 15 operate in conjunction with a lubricant 53, such as oil. The axle housing 10 and the differential housing 12 are in alignment, and they share a longitudinal axis 57. The reaction plate 30 is mounted to the differential housing 12.

The planetary gearset 17 comprises a ring gear 22, which is mounted to the reaction plate 30. The axle housing 10 is mounted to the ring gear 22. The axle housing 10 has an inner surface 80, and the differential housing 12 has an inner surface 41. When the planetary gearset 17 and the friction disc 14 rotate at a high speed, they cause the lubricant 53 to rotate. As the lubricant 53 rotates, centrifugal forces force it to travel in a radial direction away from the longitudinal axis 57. Accordingly, the lubricant 53 travels in a rotational direction and a radial direction, and the lubricant 53, ultimately, travels about the inner surfaces 41, 80 in the form of a lubricant ring 72.

Under these circumstances, the lubricant 53 may not reach the entire friction disc 14, because the lubricant ring 72 may have a lubricant ring inner diameter 74 that is larger than an inner diameter 82 (FIG. 3) of the friction disc 14. At such times, the friction disc 14 lacks the lubricant 53 in the area between the lubricant ring inner diameter 74 and the inner diameter 82. This may lead to premature failure of the brake assembly 32. To avoid this, the lubrication system 9 is provided.

The lubrication system 9 comprises a differential supply passage 58 and a plate passage 16. The differential supply passage 58 is positioned in the differential housing 12, and the plate passage 16 is positioned in the reaction plate 30. The plate passage 16 distributes a portion of the lubricant ring 72 generally to a longitudinal axis region 76 and generally to an inner diameter region 88 of the friction disc 14. The longitudinal axis region 76 is a region formed by the lubricant ring inner diameter 74, and the inner diameter region 88 is the region formed by the lubricant ring inner diameter 74 on the inboard and outboard sides 18, 20 of the friction disc 14.

Figure 2:
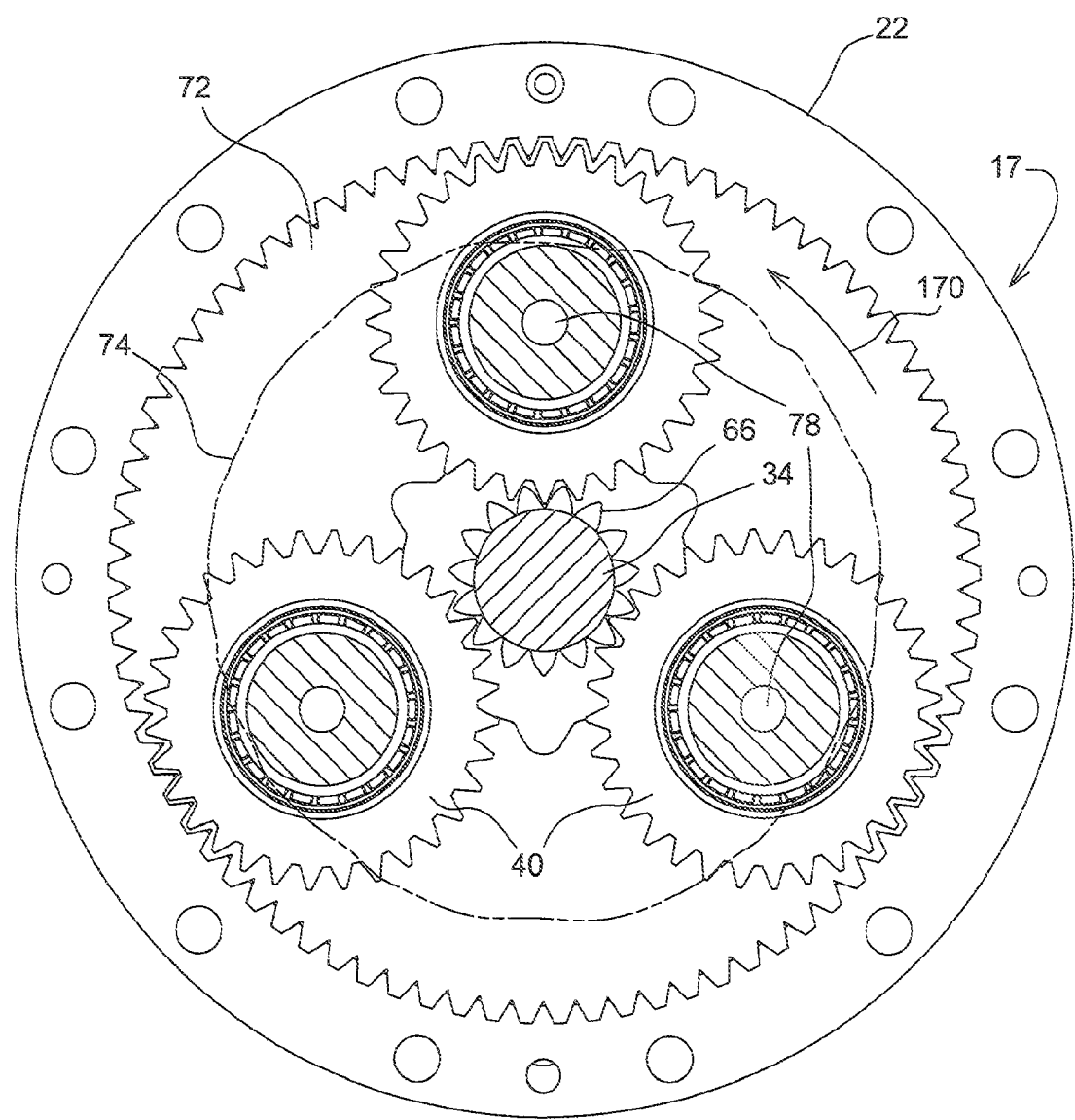
FIG. 2 is an enlarged sectional view, along line 2-2 of FIG. 1, of the planetary gearset, wherein the planetary gearset and the friction disc are rotating at a high speed.

FIG. 2 is an enlarged sectional view, along line 2-2 of FIG. 1, of the planetary gearset 17 and the friction disc 14 rotating at a high speed. A sun gear 66 is the center of the planetary gearset 17. The sun gear 66 may be either mounted about the input shaft 34 via a female spline 42 or formed into the input shaft 34. Planet gears 40 and a carrier 44 rotate about the sun gear 66, and the ring gear 22 surrounds the components of the planetary gearset 17 just described. The planet gears 40 are meshed between the ring gear 22 and the sun gear 66, and the planet gears 40 turn about the pins 78 and about the sun gear 66. The pins 78 are engaged with the carrier 44. This ensures that the planet gears 40 are held in a spaced relationship. As shown in FIG. 1, the carrier 44 may be coupled to the output shaft 36 via a carrier plate 62 and a fastener 64.

Figure 3:
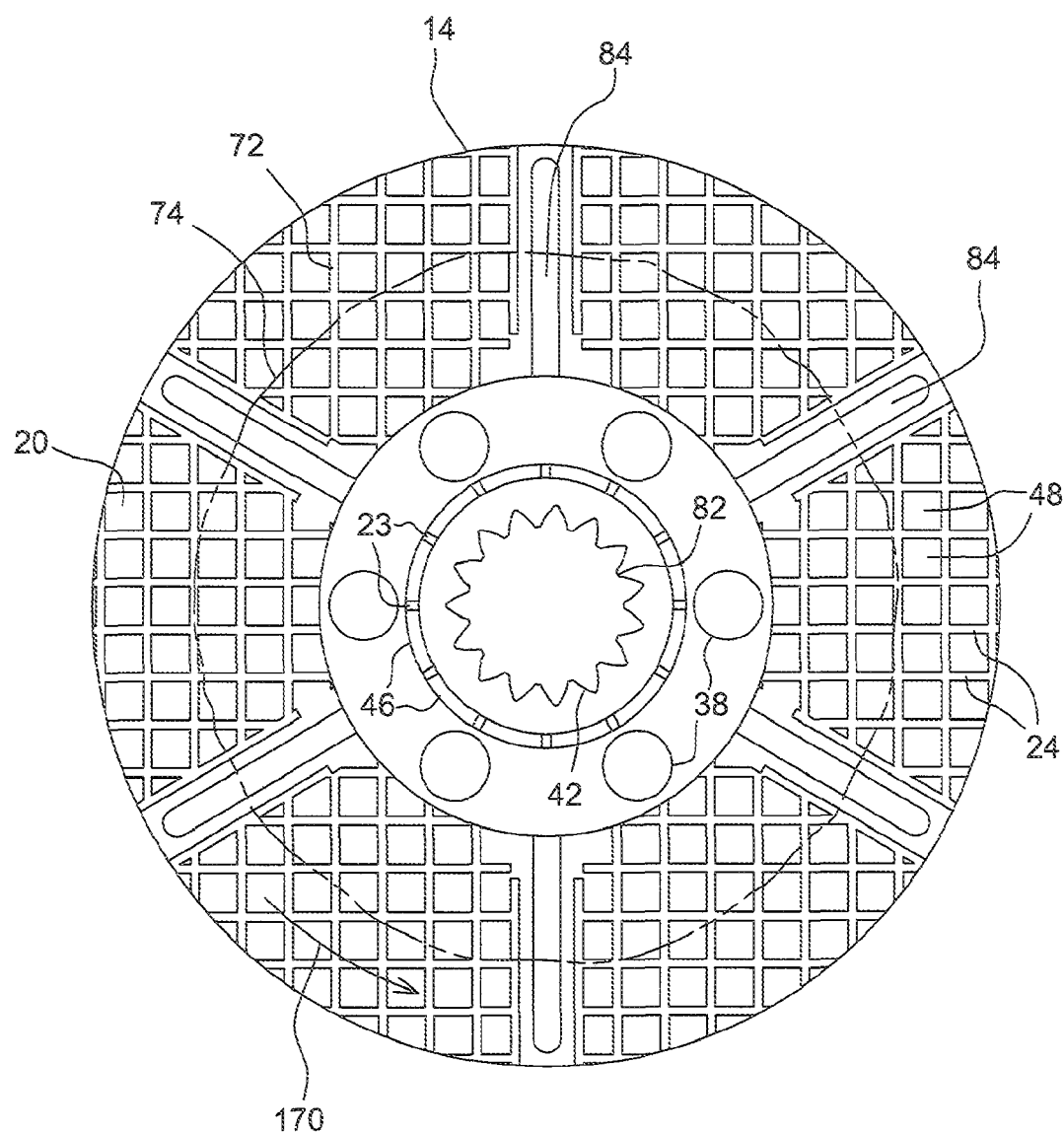
FIG. 3 is an enlarged elevational view, along line 3-3 of FIG. 1, of the friction disc, wherein the planetary gearset and the friction disc are rotating at a high speed.

Referring to FIG. 3, there is shown an enlarged elevational view, along line 3-3 of FIG. 1, of the friction disc 14. Here, the planetary gearset 17 and the friction disc 14 are rotating at a high speed. When necessary, to prevent rotation of the friction disc 14, the piston plate 68 and the reaction plate 30 clamp the friction disc 14. The friction disc 14 has an inboard side 18 and an outboard side 20, wherein the inboard side 18 is the side facing the differential housing 12, and the outboard side 20 is the side facing the axle housing 10. As already stated, the inner diameter region 88 is the region formed by the lubricant ring inner diameter 74 on the inboard and outboard sides 18, 20 of the friction disc 14.

The friction disc 14 may have inner grooves and outer grooves 23, 24 and may have inner and outer friction linings 46, 48. These features may be found on the inboard and outboard sides 18, 20. The inner grooves 23 allow some of the lubricant 53 to flow to the input shaft 34, and the outer grooves 24 facilitate the flow of the lubricant 53 to cool the friction disc 14. The inner friction lining 46 largely prevents the lubricant 53 from flowing from the friction disc 14 to the input shaft 34. The outer friction lining 48 provides the majority of the torque and energy capacity of the brake assembly 32. The inner and outer friction linings 46, 48 may comprise the same kinds of friction material. If so, they will wear at the same rate and form a self adjusting seal. When the brake assembly 32 is disengaged, the inner friction lining 46 will no longer act primarily as a seal, and the outer friction lining 48 will no longer act primarily to prevent the rotation of the friction disc 14.

To facilitate the flow of the lubricant 53 between the inboard and outboard sides 18, 20, lubrication holes 38 are provided. As such, the lubricant 53 is free to travel between the inboard side and outboard sides 18, 20. The friction disc 14 further comprises channels 84 on the inboard and outboard sides 18, 20. As the lubricant 53 flows into the channels 84, pressure develops therein. Then, when the brake assembly 32 is disengaged, the pressure forces the piston plate 68 and the friction disc 14 to reposition such that the friction disc 14 can rotate freely.

Figure 4:
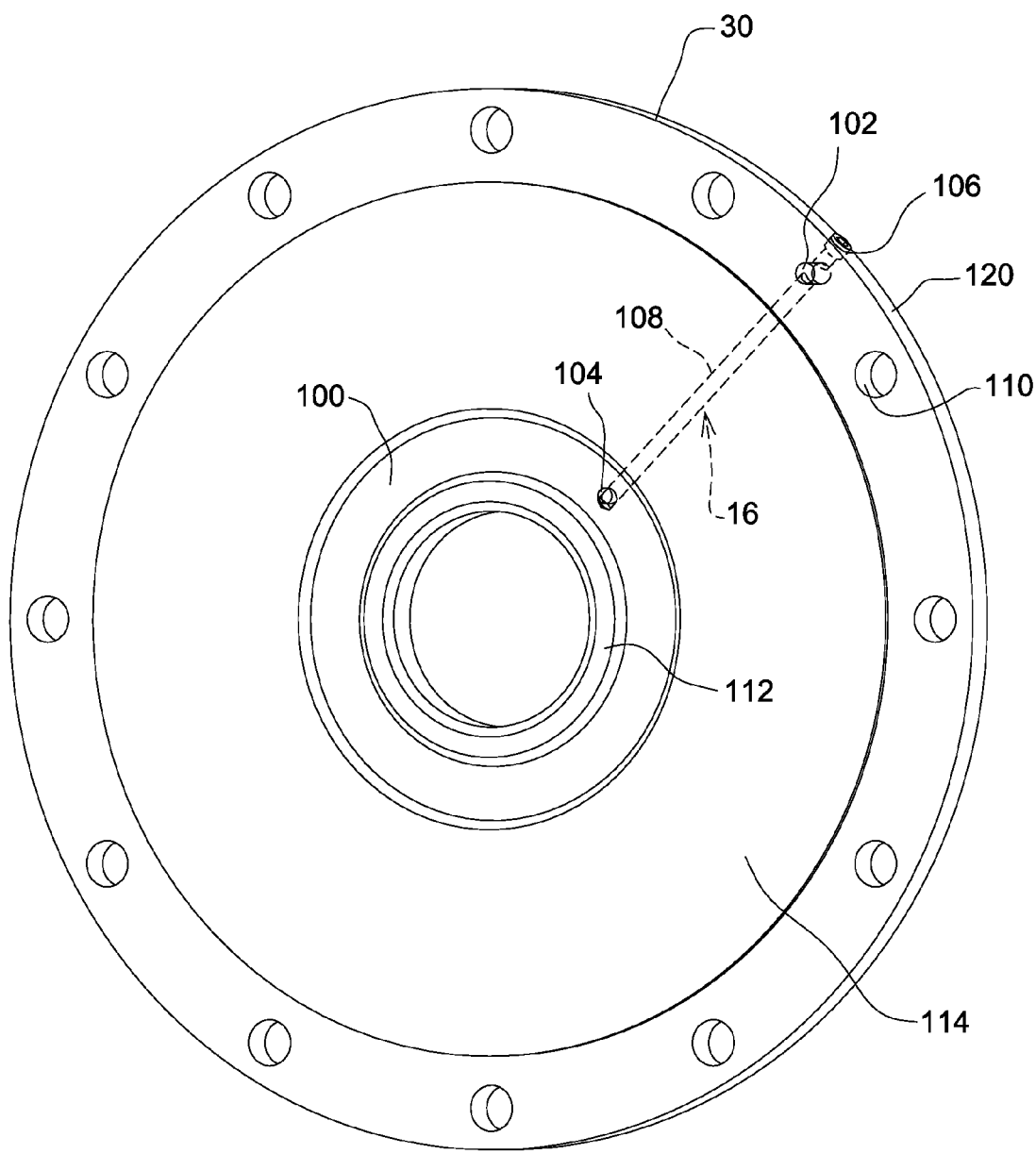
FIG. 4 is an enlarged perspective view of a reaction plate.

FIG. 4 is an enlarged perspective view of the reaction plate 30. The reaction plate 30 comprises fastener holes 110 for mounting the reaction plate 30 to the differential housing 12. Exemplarily, there are twelve fastener holes, but the number of fastener holes may vary. The reaction plate 30 is concentric to the piston plate 68 and the input shaft 34.

Exemplarily, the plate passage 16 comprises three passages: an inlet passage 102, a transfer passage 108, and an outlet passage 104. The transfer passage 108 fluidly connects the inlet passage 102 and the outlet passage 104. The inlet passage 102 receives the lubricant 53 from the differential supply passage 58. The lubricant 53, then, travels through the transfer passage 108 and the outlet passage 104. The outlet passage 104 is in intermittent fluid communication with the lubrication holes 38 (see FIG. 5). Accordingly, when the outlet passage 104 is in fluid communication with one of the lubricant holes 38, the lubricant 53 flows from the outlet passage 104 and to the inboard and outboard sides 18, 20 of the friction disc 14 (see FIG. 5).

The inlet and outlet passages 102, 104 may be perpendicular to a face 114 of the reaction plate 30, and alternatively, the transfer passage 108 may be parallel. The inlet passage 102 is shown as a through hole, but it may also be a blind hole, for example, depending on whether there are connecting fluid passages. Exemplarily, the outlet passage 104 and the transfer passage 108 are blind holes. Exemplarily, the inlet passage 102, the outlet passage 104, and the transfer passage 108 are all machined.

The reaction plate 30 may have a reaction plate recess 100, and the piston plate 68 may have a piston plate recess 116. Exemplarily, the recess 100, 116 are concentric to one another, and they are intermittently concentric with the lubrication holes 38. The recess 100, 116 cooperate with one another to facilitate the flow of the lubricant 53 to the inboard and outboard sides 18, 20 of the friction disc 14.

A reaction plate plug 106 may be engaged with the reaction plate 30 to prevent the lubricant 53 from flowing from the transfer passage 108 towards the outer diameter 120. Further, the reaction plate 30 may have a raised surface 112, wherein it mates with the inner friction lining 46 to limit the flow of the lubricant 53 to the input shaft 34.

Figure 5:
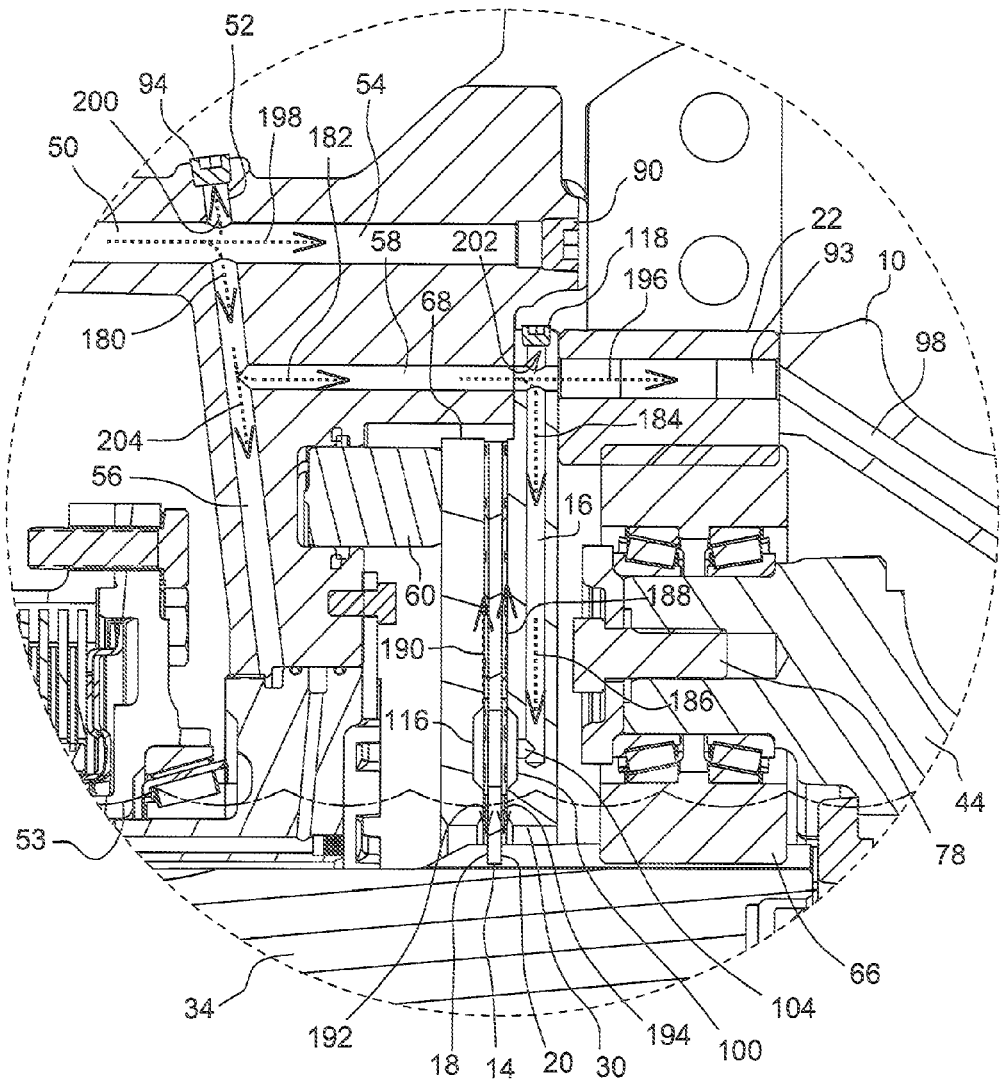
FIG. 5 is an enlarged sectional view of the final drive comprising the lubrication system, wherein the planetary gearset and the friction disc are rotating at low speed.

FIG. 5 is an enlarged sectional view of the final drive 25 comprising the lubrication system 9. Here, the planetary gearset 17 and the friction disc 14 are rotating at a low speed. A low speed is a speed that does not cause the lubricant 53 to form the lubricant ring 72. As such, the lubricant 53 is generally level in the axle housing 10, and it may reach the longitudinal axis 57 or higher. Consequently, at a low speed, the friction disc 14 and the planetary gearset 17 are at least partially submerged in the lubricant 53. Thus, the lubricant 53 is capable of lubricating the surfaces of the friction disc 14 and the planetary gearset 17 as they rotate, even without the help of the lubrication system 9.

Figure 6:
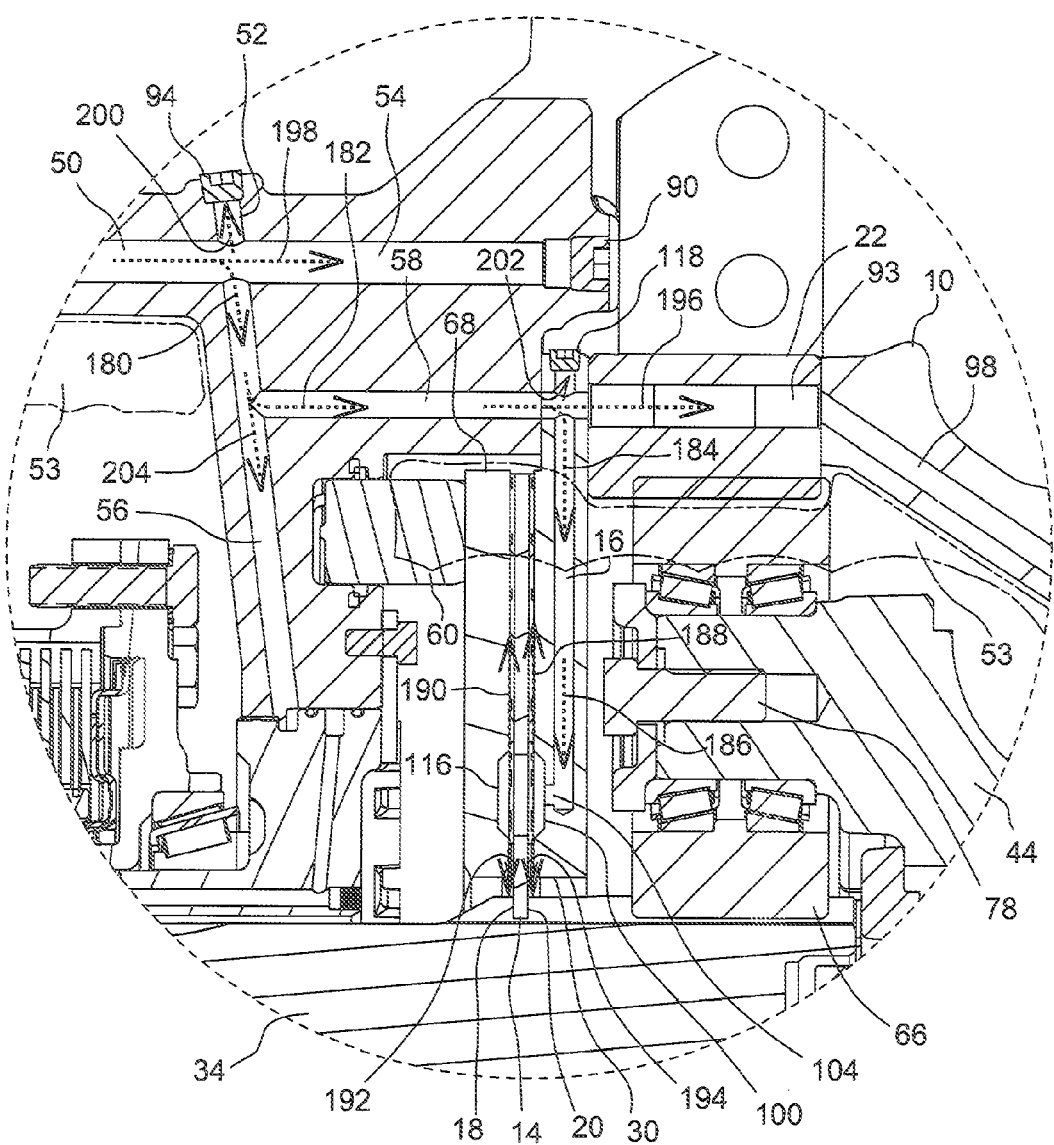
FIG. 6 is an enlarged sectional view of the final drive comprising the lubrication system, wherein the planetary gearset and the friction disc are rotating at a high speed.

FIG. 6 is an enlarged sectional view of the final drive 25 comprising the lubrication system 9. Here, the planetary gearset 17 and the friction disc 14 are rotating at a high speed. A high speed is a speed that causes the lubricant 53 to form the lubricant ring 72. As previously discussed, when the planetary gearset 17 and the friction disc 14 rotate at a high speed, the lubricant 53 travels about the inner and outer surfaces 80, 41, and the lubricant ring 72 forms. Under these circumstances, the lubricant ring inner diameter 74 may be larger than the inner diameter 82 of the friction disc 14. To ensure that the lubricant 53 reaches the entirety of the friction disc 14, the lubrication system 9 provides the lubricant 53 to the inner diameter region 88 of the friction disc 14 via the plate passage 16.

As stated above, the lubrication system 9 comprises the differential supply passage 58 positioned in the differential housing 12, and it further comprises the plate passage 16 positioned in the reaction plate 30. The lubricant 53 enters a first differential passage 50 (arrow 180), which may be in fluid communication with a hydraulic charge pump (not shown).

Once the lubricant 53 flows through the differential supply passage 58 (arrow 182), it flows through the plate passage 16 (arrow 184). As described above, the plate passage 16 may comprise three passages: the inlet passage 102, the transfer passage 108, and the outlet passage 104. The inlet passage 102 receives the lubricant 53 from the differential supply passage 58. The lubricant 53 then flows through the transfer passage 108 and, finally, the outlet passage 104.

The outlet passage 104 is in intermittent fluid communication with the lubrication holes 38. In this way, the plate passage 16 distributes the lubricant 53 generally to the longitudinal axis region 76 and generally to the inner diameter region 88 of the friction disc 14. To do this, the lubricant 53 flows across the friction disc 14 on the inboard side (arrows 190 and 192) or on the outboard side (arrows 188 and 194). The flow of the lubricant 53 through the lubrication holes 38 occurs intermittently as one of the lubrication holes 38 passes across the outlet passage 104. The inner grooves 23 allow some of the lubricant 53 to flow to the input shaft 34, and the outer grooves 24 facilitate the flow of the lubricant 53 for cooling the friction disc 14. The inner friction lining 46 acts primarily as a seal to discourage the lubricant 53 from flowing from the friction disc 14 to the input shaft 34. Meanwhile, the outer friction lining 48 provides the majority of the torque and energy capacity of the brake assembly 32.

There are several other passages that may be in fluid communication with the lubrication system 9. First, a portion of the lubricant 53 may flow through a second differential passage 52 and may be blocked via a plug 94 (arrow 200). Additionally, a portion of the lubricant 53 may flow through a third differential passage 54 and may be blocked via a plug 90 (arrow 198). Further, a portion of the lubricant 53 may flow though a fourth differential passage 56 (arrow 204) and lubricate a differential bearing (not shown). Also, a portion of the lubricant 53 may be blocked by a plug (arrow 202). Finally, a portion of the lubricant 53 may flow through a ring passage 93 and an axle passage 98 (arrow 196) and, then, may then flow to a final drive bearing 122 (see FIG. 1).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A final drive comprising a lubrication system, the final drive further comprising a differential housing, a reaction plate mounted to the differential housing, a shaft rotatably disposed within the differential housing, and a friction disc mounted about the shaft and fixed for rotation therewith, the friction disc comprising a lubrication hole and inner and outer bands of friction lining that are each concentric with the shaft, the lubrication hole being positioned between the inner and outer bands of friction lining, the lubrication system, comprising:
   a differential supply passage positioned in the differential housing; and
   a plate passage, wherein the plate passage is positioned in the reaction plate, the plate passage is in fluid communication with the differential supply passage, and the plate passage is in intermittent fluid communication with the lubrication hole.

2. The final drive of claim 1, wherein the reaction plate has a face, and the plate passage comprises an inlet passage, a transfer passage, and a outlet passage, wherein the inlet passage and the outlet passage are perpendicular to the face, the transfer passage is parallel to the face and between the inlet passage and the outlet passage.

3. The final drive of claim 2, the final drive further comprising planetary gearset comprising a ring gear, wherein the ring gear is mounted to the reaction plate.

4. The final drive of claim 3, wherein the axle housing is mounted to the ring gear.

5. The final drive of claim 1, the final drive further comprising a planetary gearset comprising a ring gear, the ring gear is mounted to the reaction plate, and an axle housing is mounted to the ring gear.

6. The final drive of claim 5, further comprising:
   a shaft disposed within at least one of the axle housing and the differential housing; and
   a friction disc mounted about the shaft and fixed for rotation therewith.

7. The final drive of claim 6, further comprising:
   the friction disc has an inboard side and an outboard side, wherein the inboard side is the side facing the differential housing, and the outboard side is the side facing the axle housing;
   the friction disc has an inner diameter region, wherein the inner diameter region is the region formed by an inner diameter of a lubricant ring on the inboard and outboard sides; and
   the plate passage distributes a portion of the lubricant ring to the outboard side of the inner diameter region of the friction disc.

8. The final drive of claim 7, wherein the friction disc comprises a channel.

9. The final drive of claim 8, wherein the inner band of friction lining wears at the same rate as the outer band of friction lining.

10. The final drive of claim 6, the final drive further comprising a piston plate, wherein the piston plate and the reaction plate are concentric to the shaft, the friction disc is between the piston plate and the reaction plate, the piston plate is slideably mounted such that the piston plate and the reaction plate can clamp the friction disc.

11. The final drive of claim 10, wherein the piston plate has a circular piston plate recess, the reaction plate has a reaction plate recess, and the piston plate recess and the reaction plate recess are concentric with the lubrication hole to facilitate a flow of a pressurized lubricant.

12. The final drive of claim 1, wherein the inner band of friction lining wears at the same rate as the outer band of friction lining.

13. The final drive of claim 12, wherein the friction disc comprises a channel.

14. The final drive of claim 1, the final drive further comprising a piston plate, wherein the piston plate and the reaction plate are concentric to the shaft, the friction disc is between the piston plate and the reaction plate, the piston plate is slideably mounted such that the piston plate and the reaction plate can clamp the friction disc.

15. The final drive of claim 14, wherein the piston plate has a circular piston plate recess, the reaction plate has a reaction plate recess, and the piston plate recess and the reaction plate recess are concentric with the lubrication hole to facilitate a flow of a pressurized lubricant.

* * * * *